United States Patent Office 3,296,337
Patented Jan. 3, 1967

3,296,337
AIR DRYING UNSATURATED POLYESTERS FROM DIALLYLIDENE PENTAERYTHRITOL, HYDROXYL TERMINATED ESTERS, AND ALLYL AND BENZYL ETHERS
Rolf Zimmermann, Wiesbaden-Biebrich, Germany, assignor to Chemische Werke Albert, Wiesbaden-Biebrich, Germany, a corporation of Germany
No Drawing. Filed Jan. 4, 1963, Ser. No. 249,326
Claims priority, application Germany, Jan. 13, 1962, C 25,993
18 Claims. (Cl. 260—867)

This invention relates to a new type of synthetic resin polymers and their production. The chemical and physical characteristics of these new resins make them especially well adapted for the production of cast resins.

This appplication is related to copending applications Serial No. 20,825, filed April 8, 1960, now Patent 3,209,054 and 134,027, filed August 23, 1961 by the present applicant and Alfred Englisch.

It is known that unsaturated acetals such, for instance, as obtained from glycol and acrolein can add on monohydric or polyhydric alcohols whereby ether or polyether cycloacetals are formed. It is further known that by the reaction of acrolein with polyhydric alcohols, especially pentaerythritol, in the presence of certain catalysts there are formed either synthetic resins or mono- and diallylidene acetals which, with further still free OH-groups, form polyether cycloacetals.

It is also known that glass-like, colorless or slightly colored, infusible resins with good chemical and physical characteristics are obtained when esters which have been obtained from an $\alpha,\beta$-unsaturated dicarboxylic acid and polyhydric alcohols and which still contain free excess alcoholic hydroxyl groups, are added to diallylidene pentaerythritol and the resulting polyadducts are copolymerized with a polymerizable monomer having the group $>C=CH_2$ and containing from 3 to 16 carbon atoms under catalytic influence, preferably in the presence of one or more polymerization catalysts. The term "free excess alcoholic hydroxyl groups" means that the ester contains more free alcoholic hydroxyl groups than carboxyl groups.

It is also known to improve the storability of the polyadducts by the addition of basic substances in an amount which is about equivalent to that of the acid catalyst used in the preparation of said polyadduct.

I have now found that the sensitivity of the aforementioned copolymerization products of (A) the said polymerizable monomers and (B) the polyadducts of (1) a diallylidene acetal, said acetal being either diallylidene pentaerythritol or a diester of a dicarboxylic acid and a monoallylidene acetal of an at least trihydric alcohol, said monoallylidene acetal still containing one reactive hydroxy group, or a mixture thereof and (2) the said esters of ethylenically unsaturated dicarboxylic acids towards oxygen can be very much reduced by adding to the $\alpha,\beta$-unsaturated dicarboxylic acid ester and/or the diallylidene pentaerythritol an allyl or benzyl ether of a polyhydric alcohol, which ethers contain at least one, preferably however two free hydroxy groups in their molecule. Of course, a mixture of one or more of these ethers may be used. The afore-said ethers are generally applied in an amount between 5 and 70, more suitably 10 to 60 and preferably 20 to 50 percent by weight, calculated on the sum of the dicarboxylic acid ester and the diallylidene acetal. It is however also possible, to add besides the said ethers a minor amount, in general between 5 and 15, percent by weight, calculated on the amount of the alcohol ester, of allyl alcohol.

The addition products, thus obtained, are dissolved in a α-substituted ethylene compounds and copolymerized in customary manner. The copolymerization products are either completely clear, clear as water, or slightly yellowish or brownish in colour. Even very thin layers, i.e. layers which have a large surface on which oxygen may influence the polymerization, are polymerized at room temperature within a few minutes to a few hours to yield a tack-free product with an excellent hardness and a permanent high gloss surface and an excellent resistance against chemical agents such as alkalis and acids. This means that no air-inhibition occurs, which is of great importance for the manufacture; accordingly no further processing such as abrasion or polishing is necessary, though of course such further processing may be carried out. The untreated surfaces already excel through high scratch-resistance. Although finishing is not required as a rule, the varnish films can be, if desired, abraded and polished. For the above reasons, the resins processed according to the invention are either per se or when admixed before polymerization with fillers especially suitable in the production of molded articles, cast resins, knifing glazes, varnish resins and coatings for the lamination of glass and textile fibers and for the production of adhesives. The resins are also characterized by a good adhesivity, e.g. on wood, glass, metal or plastics. However, when preparing thin coatings, the addition of a small amount of a silicone oil or an amine-resin, such as a condensation resin of formaldehyde with urea, melamine or benzoguanamine may be advantageous for improving the course-furthering properties.

According to a preferred embodiment a mixture of $\alpha,\beta$-unsaturated dicarboxylic acids and up to 50, preferably up to 30, equivalent percent of polycarboxylic acids containing no acetylenic or polymerizable olefinic bond, or anhydrides of such acids may be used instead of pure $\alpha,\beta$-unsaturated dicarboxylic acids for preparing the esters, used as starting materials. The products obtained from such resins have improved mechanical and electrical properties, e.g. a reduced surface resistance.

In the absence of an addition of the allyl and/or benzyl derivatives the oxygen of the air frequently causes an incomplete polymerization at the surface of the resin. As a consequence, the surfaces are not scratch resistant, as it is often desired, so that they must at any rate be abraded and polished.

The resins of the invention can also be modified by an addition of one or more halosilanes to the polyadduct before the polymerization is carried out. Silicon modification takes place if the resins produced according to the invention have a sufficiently high number of free hydroxyl groups to form silicon bridges. For this reason, the reaction of the cycloacetal and the ester is advantageously interrupted as soon as the OH-number lies between 80 and 130, preferably 100 and 120. Suitable halosilanes are e.g. methyldichlorosilane, dimethylchlorosilane, diphenyldichlorosilane, diethyldichlorosilane, methylphenyldichlorosilane, phenyltrichlorosilane, ethyltrichlorosilane, which are added in an amount of, for example, 1 to 25 percent, preferably 5 to 15 percent, calculated on the weight of the polyadduct. These silicium-containing resins have an improved resistance to heat and chemical agents and have also improved electrical properties.

Diallylidene pentaerythritol is a known compound and is considered to have the following formula:

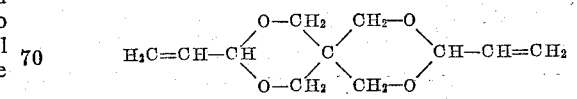

The diesters of the dicarboxylic acid and the monoallylidene acetal are also known compounds. They may be produced by transesterifying from dimethyl esters of aromatic saturated or olefinically unsaturated dicarboxylic acids such as those mentioned below with a monoallylidene acetal of an at least trihydric alcohol, said acetal still containing one reactive hydroxy group. Suitable polyhydric alcohol components are e.g. glycerol, trimethylolethane, trimethylolpropane, hexanetriol-1,2,6, monomethyl or -allyl ether of pentaerythritol or of 2,2,6,6-tetramethylolcyclohexanone or -hexanol. In the last-mentioned compound the free hydroxy group attached to the cyclic carbon atom is no longer reactive for esterification reactions due to steric hindrance.

In the production of the esters of dicarboxylic acids, containing on an average per molecule more than one free alcoholic hydroxy group, saturated aliphatic polyhydric alcohols are preferably used in the esterification. These alcohols may be reacted with dicarboxylic acids in a known manner by reacting the dicarboxylic acid with more than one equivalent, generally at least 1.1 and preferably between 1.2 and 1.5 equivalents of the polyhydric alcohol. For example, 2 or even more equivalents of the polyhydric alcohol may be used per equivalent of the dicarboxylic acid. In most cases the esters so produced are mixtures of monomeric and oligomeric esters and have an acid number between 5 and 50 and a hydroxyl number between 100 and 350. Preferably the acid number is in the range from 10 to 30 and the hydroxyl number is in the range from 170 to 300.

A variety of polyhydric alcohols may be used to form the esters but among the suitable saturated aliphatic polyhydric alcohols the low molecular polyhydric alkanols and polyhydric alkanol ethers derived therefrom are preferred. Typically such compounds contain not more than 6–10 carbon atoms and include such polyhydric compounds as ethylene glycol, diethylene glycol, triethylene glycol, 1,2-propylene glycol, 1,3-propanediol, the various butane-, pentane- or hexanediols or 2,2-dialkylpropanediols such as butanediol-1,4, butanediol-1,3, or butanediol-2,3, hexanediol-1,6, 2,2-dimethylpropanediol-1,3, 2-ethyl-2-butylpropanediol-1,3, butenediol-1,4, glycerol, trimethylol ethane, trimethylol propane, dimethylolbenzene as well as their derivatives, substituted in the nucleus, 4,4'-dihydroxydicyclohexylalkanes, bis-ethylene, bis-propylene, or bis-butylene glycol ethers thereof or such ethers of the 4,4'-dihydroxydiphenylalkanes or of the 4,4'-dihydroxy-3,3'-diallyldiphenylalkanes, e.g. the 2,2-propanes. There are also suitable those at least trihydric alcohols in which the third or the additional hydroxy groups are etherified, acetalized or ketalized or esterified so that these alcohols contain still two free hydroxy groups. Suitable ethers of this type are the monoethers of glycerol or of trimethylolethane or trimethylolpropane in which the etherifying group is an alkyl or an aryl radical such as butanol, stearyl alcohol, oleyl alcohol or a mixture of fatty alcohols, or like diethers of pentaerythritol. Suitable esters of this type are e.g. compounds in which the said alcohols are esterified with, for example, benzoic acid, fatty acids originating in drying, semi-drying or non-drying oils, acetic acid, acrylic acid or methacrylic acid. The addition product of cyclopentadiene to butenediol (i.e. dimethylolendomethylenecyclohexene) is also suitable. The alcohol ester may also be modified by building in a small amount, e.g. up to 20 equivalent percent, of monohydric alcohols such as butanol or the other aforementioned monohydric alcohols or allyl or benzyl alcohol which may be substituted. Also, mixtures of various compounds may be used.

Suitable α,β-unsaturated dicarboxylic acids are maleic acid, fumaric acid, itaconic acid, citraconic acid, mesaconic acid, tetrahydrophthalic acid (=tetramethylene maleic acid), endomethylene-Δ-1,2-tetrahydrophthalic acid and the like or anhydrides of such acids, where they exist.

Suitable polycarboxylic acids which may be admixed with the α,β-unsaturated dicarboxylic acids are, e.g. succinic, glutaric, adipic, pimelic, suberic, azelaic, sebacic, ortho-, iso- or terephthalic acid or the hexahydrogenation products thereof, endomethylenehexahydrophthalic acids obtained by a reaction of maleic anhydride with cyclopentadiene or linseed oil fatty acid, dimerized fatty acids such as dimerized linseed oil or dehydrated castor oil fatty acid, trimellitic acid, pyromellitic acid. As far as these acids contain more than two carboxylic groups, the carboxylic groups contained in the molecule in excess of two may be esterified by monohydric alcohol radicals such as alkyl radicals of 1 to 6 carbon atoms. Hydroxy acids such as lactic acid, ricinoleic acid, citric acid, or chlorinated polybasic carboxylic acids, such as tri- or tetrachlorophthalic acid or hexachloroendomethylene-tetrahydrophthalic acid may also be used. If chlorine-containing acids constitute an acid component, they may be adjusted in such an amount that the final resin is not combustible. On the other hand, the polymerization is not impaired by the presence of the non-polymerizable dicarboxylic acids. Furthermore, mixtures of several unsaturated and/or other carboxylic acids may be used.

It will be seen that when the above noted polyhydric alcohols are reacted with the above noted α,β-unsaturated dicarboxylic acids in the stated molar proportions, the esters will always contain on an average per molecule, more than one free and reactive alcoholic hydroxy group.

The above-mentioned allyl ethers which may be substituted are ethers unsaturated in β,γ-position containing the group

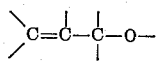

and at least one free hydroxy group. Suitable ethers are the ethers of the allyl, methallyl, ethallyl, crotyl, chlorallyl or cinnamyl alcohols, of butene-1-ol-3 or of butenediol-1,4. The hydroxy group is preferably the alcoholic hydroxy group, but may also be the hydroxy group of a carboxylic group; thus the allyl ether of maleic acid (=allylhydroxysuccinic acid) or the allyl ether of hydroxy acetic acid are suitable compounds too.

Suitable allyl and benzyl ethers of the afore-mentioned type are ethylene glycol monoallyl ether or the allyl or benzyl ethers of the various above-mentioned dihydric alcohols, furthermore glycol diallyl ethers, or dibenzyl ethers, glycerol-α-alkyl ether, glycerol-α-benzyl ether or the corresponding glycidyl ethers, trimethylol ethane- or trimethyl propane-monoallyl ether or monobenzyl ether or the corresponding diethers, pentaerythritol-mono-allyl ether or -diallyl ether or triallyl ether, pentaerythritol-mono-benzyl ether or -dibenzyl ether or -tribenzyl ether, the mono- or diallyl, methylallyl, crotyl-, butene-1-ol-3, benzyl or methyloltoluene ethers of trimethylol ethane or trimethylol propane, 2,2,6,6-tetramethylolcyclohexanoltriallyl ether, the mono- or dihydroxy ethyl or propyl ethers of butenediol-1,4, monoalkyl or monobenzyl ethers of hexanetriol or the corresponding diethers, mixed ethers of pentaerythritol containing one or two allyl or benzyl groups besides another monovalent alkyl or aryl radical such as the methyl, ethyl, propyl, butyl, hexyl, iso-octyl, dodecyl, stearyl, oleyl, phenyl, tolyl, p-methoxyphenyl or ethylene glycol monoethylether radical, or mixed ethers of pentaerythritol which contain several different radicals having the group

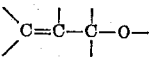

e.g. one allyl and one benzyl group.

The allyl or benzyl ethers which still contain free hydroxy groups react with the diallylidene diacetal exclusively in a way such that the hydroxy groups are added onto the terminal olefinic bonds of the diallylidene diacetal. By this reaction new ether bridges are formed as is shown in the following formula for the reaction of trimethylol propane monoallylether with diallylidene pentaerythritol

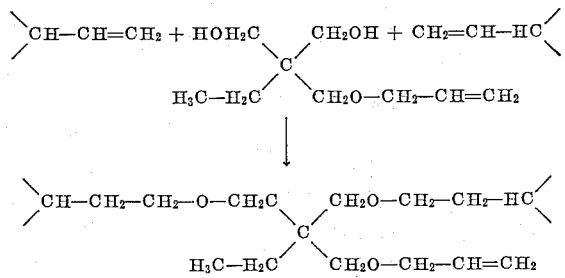

At the same time the free hydroxy groups of the alcohol esters are also added to terminal olefinic bonds of the diallylidene penetaerythritol, while also forming ether bridges. In this way soluble linear polyethers acetals are formed in which the allyl groups are almost exclusively bound to ethereal oxygen.

For the above reason the diallylidene pentaerythritol is used in an amount which is equivalent to the amount of the hydroxy groups present in the alcohol ester and the other reactants to react said terminal olefinic bonds with said hydroxy groups. The diallylidene pentaerythritol may, however, be used in an amount up to 30%, preferably up to 10%, higher or lower than said equivalent amount.

The formation of the polyadducts hereof may be activated by the presence of catalytic amounts, e.g. about 0.01 to 4, suitably 0.25 to 2 mol percent, calculated on the total amount of the reactants, of one or more addition catalysts. Suitable catalysts are boron trifluoride complex compounds or inorganic or organic acids. Suitable borotrifluoride complex compounds are the etherates of aliphatic or cyclic ethers, such as of the ethyl, propyl, isopropyl, butyl ethers, of tetrahydrofuran, the monoacetyl ester of the ethylene glycol monomethyl or monoethyl ether, urea etc. Suitable acids, for instance, include phosphoric acid, sulfuric acid, sulfonic acid such as p-toluene sulfonic acids, camphor sulfonic acid or 2-chloro-cymene-5-sulfonic acid, glacial acetic acid, halogeno-acetic acids, such as monochloro- or -bromo-, dichloro- or trichloro acetic acid or so-called Lewis acids such as boron trifluoride or—less suitable aluminum chloride, zinc chloride, tin tetrachloride, and the like. However, the use of boron trifluoride or boron trifluoride complex compounds is most preferred and allows to carry out the addition reaction in a reduced period of time or at a temperature being about 20 to 30° C. lower or while using only half of the amount, or even less, of the catalyst. Especially when using boron trifluorid or, even more, complex compounds of boron trifluoride, bright, clear and high-viscous polyadducts are obtained. Usually reaction will take place by merely mixing the reactants with the catalyst at room temperature and a temperature between 20 or 30 and 120° C. is customarily used. Temperatures between 40 and 100 and more especially between 50 and 70° C. are preferred.

In many cases the use of polyether aretals is advantageeous which have been formed from diallylidene pentaerythritol and about the stoishiometrically equivalent amount of an ester produced by a reaction of a polyhydric alcohol with a polybasic unsaturated carboxylic acid, or which has been formed from diallylidene pentaerythritol and a mixture of esters containing the afore-mentioned ester. In this case the ester or the mixture of esters respectively contains more than two hydroxy groups per molecule and preferably between about 6 and about 26% of free hydroxy groups.

In the formation of the polyadducts with the above noted esters of the α,β-unsaturated dicarboxylic acids, the esters may be used together with polyhydric alcohols such as ethylene glycol, diethylene glycol, triethylene glycol, trimethyl propane, 4,4'-dihydroxydicyclohexyl - propane-2,2 or the other above-mentioned polyhydric alcohols and/or with polynuclear diphenols, preferably p,p'-dihydroxydiphenyl propane or its dihydroxyethyl ether. Normally these polyhydric compounds are used in a minor proportion relative ot the weight of the ester containing the free alcoholic hydroxy groups.

The character of the polyadducts and of the finally prepared resins produced is dependent upon the type and concentration of the catalyst as well as upon the temperature used and time of the reaction.

The polyadducts obtained generally have a hydroxy value of less than 150, more preferably less than 100, and an acid number below 40, which values are usually reached after a reaction time of 2 to 6 hours. They are capable of further reaction with polymerizable, α-substituted ethylene compounds to form copolymers which have properties rendering them especially useful for the formation of laminations and cast resins and for use as adhesives. Suitable polymerizable α-substituted ethylene compounds have been described in various patents, e.g. U.S. 2,844,559, 2,843,556 and the patents referred to therein. They include for instance vinyl compounds such as vinyl toluene, vinyl pyrrolidone, styrene, α-methyl styrene, chlorostyrene, vinyl acetate, vinyl propionate, allyl acetate, allyl propionate, diallyl maleate, fumarate, itaconate, succinate, adipate, azelate, sebacate, or phthalate, triallylphosphate, methyl, ethyl, propyl, or butyl (primary, secondary, tertiary or iso), amyl, hexyl, octyl or allyl acrylate, or methacrylate, diallyitaconate, acrylonitrile, or a mixture of such monomers. Cross-linking agents, such as divinylbenzene, may additionally be used. Accordingly the preferred monomers are compounds containing the group >C=CH$_2$ bound to a negative radical, such as a benzene nucleus, or the ester group

Suitably these compounds contain no conjugated olefinic bonds. In general, normally liquid polymerizable vinyl and vinylidene monomers are preferred. By using these liquid monomers, solutions or liquid dispersions of the polyadduct resin can be formed which are especially well adapted for use in the above noted applications. The weight ratio of the polyadduct to the polymerizable α-substituted ethylene compound has been found to be quite satisfactory between about 9:1 and 1:4, preferably between about 4:1 and 1:1.

In the beginning of the reaction between the ester and the diallylidene acetal, the miscibility of the adduct increases as the addition advances, but the OH-number of the adduct should be preferably maintained less than 100. If, however, the addition progresses too far, the solubility, or miscibility, of the adduct with the polymerizable α-substituted ethylene compound begins to decline.

The stability of the solution of the adducts hereof in suitable α-substituted ethylene compounds which is a very desirable property for the preferred fields of use may be improved by the addition of basic substances which, contrary to conventional stabilizers such as antioxidants of the type of hydroquinone or phenolic compounds will very effectively stabilize the solution. The stabilizer is preferably used in an amount which is at least equivalent to that of the acid catalyst, or, in other words, in an amount of, e.g., 0.01 to about 4 percent, preferably about 0.1 to about 2 percent, calculated on the weight of the components from which the adduct is prepared. The compositions containing appropriate amounts of the basic substances, and preferably additionally 0.005 to 0.01 percent by weight of hydroquinone, pyrocatechol, 3-isopropyl pyrocatechol, or a similar acting phenolic compound, remain stable for many months and in many instances no changes are noticeable after six months. In the absence of these basic reacting stabilizers, frequently the polyadducts dissolved in styrene, for instance, will gel in two to four hours. The presence of these basic substances does not reduce the effectiveness of known polymerization inhibitors such as substituted pyrocatechin (catechol), hydroquinone or the like. Surprisingly, and advantageously, these basic-reacting substances seem to have a brightening effect upon the formed resins and inhibit yellowing.

Suitable basic-reacting substances include, both organic and inorganic substances such as, for instance, alkali metal hydroxide, alkali metal alcoholate, alkali metal carbonates, alkaline earth metal hydroxides, organic bases such as piperidine, morpholine, ethylene diamine, pyrrolidine, or the like. As stated, they are preferably used in a quantity equivalent to the catalyst used. In this way, the products of addition can be stabilized and can thus be made suitable for their further processing. Simultaneously with the stabilization, a brightening of colour, as a rule, is brought about.

The copolymerization of the mixture of the polyadduct resin with the polymerizable α-substituted ethylene compound, which mixture may have been stabilized, may be induced by organic peroxides or any other catalyst heretofore found useful for the polymerization of the vinyl compound. Suitable peroxides includes, for instance, benzoyl peroxide, 2,4-dichlorobenzoyl peroxide, acetyl peroxide, tert. butyl peroxide or hydroperoxide, succinyl peroxide, lauroyl peroxide, cyclohexyl hydroperoxide, cyclohexanone peroxide, methylethylketone peroxide, methylisobutylketone peroxide, cumol hydroperoxide, 2,2-bis-(tert.-butyl peroxy) butane, and as well, also tert. butylperbenzoate and the like. Also conventional accelerators may be used together with the organic peroxides such as dimethyl aniline, dimethyl toluidine, cobalt naphthenate, cobalt octoate, lauryl mercaptan or similar substances. The copolymerization is preferably carried out at room or mildly elevated temperatures, but also at higher temperatures such as above 100° C., e.g. between 10 and 150° C. or preferably between 20 and 80° C.

Conventional fillers, extenders, colouring agents and the like may be used in the production of products of the invention. Suitable fillers include asbestos, calcium carbonate, ground glass and silicon carbide. Compatibility with the resin is good. By the use of colouring agents such as organic dye-stuffs or pigments desired esthetic characteristics may be attained. None of these additional agents disturb the copolymerization of the adducts with the polymerizable α-substituted ethylene monomer.

The polyether acetals may be modified by adding acrolein diallyl acetal either in the manufacture of the polyadduct or in the copolymerization of said polyadduct with monomeric vinyl compounds. The acrolein diallyl acetal may be added in an amount up to 50% by weight of the diallylidene pentaerythritol used.

An understanding of the invention will be facilitated by the following detailed and specific, but purely illustrative examples, in which all parts are expressed as parts by weight.

*Example 1.*—24 parts of an ester prepared by condensing 0.5 mol maleic anhydride, 0.45 mol fumaric acid, 0.05 mol phthalic anhydride, 1.2 mol ethylene glycol and 0.3 mol propylene glycol in the melt, which ester has OH-value of 236 and an acid value of 15, were reacted with 21.7 parts of diallylidene pentaerythritol and 7 parts of glycerol-α-allyl ether having an OH-value of 825, in the presence of 0.25 part of boron trifluoroidebutyletherate for 4 hours at 70° C. while passing a current of carbon dioxide through the reaction mixture. The resulting highly-viscous resin having OH value of 95 and acid value of 12 was then mixed with 32 parts of styrene and stabilized by the addition of 0.06 part of sodium hydroxide dissolved in methanol and 0.005 part of hydroquinone. After filtration a limpid resin solution was obtained from which film-coatings were prepared on wood after 3 parts of a solution of methyl-ethylketone peroxide in dimethylphthalate (40% strength) and 0.75 part of a solution of cobalt naphthenate in styrene, the cobalt content of which was 4%, had been added. These coatings were, even when exposed to atmospheric oxygen, so dry after 10 minutes that no dust adhered thereto and were after 55 minutes tack-free. After some hours the surface of the coatings could no longer be scratched by a nail and had a high gloss. If desired the coatings could be abraded and polished though this was not necessary.

*Example 2.*—398 parts of a diallylidene pentaerythritol were reacted with 140 parts of glycerol-α-allyl ether and 480 parts of an ester having the acid value 40 and the OH value 190 which had been prepared as specified below, in the presence of 4.05 parts of boron trifluoride ethyl etherate at a temperature of 60° C. while passing a current of carbon dioxide through the reaction mixture. The ester was prepared by reacting 470 parts of maleic anhydride, 372 parts of fumaric acid, 700 parts of ethylene glycol and 122 parts of propanediol-1,2 in the melt.) The resinous material thus produced had OH value 90 and acid value 23. 1.2 parts of solid sodium hydroxide dissolved in methanol, 0.1 part hydroquinone and 440 parts of styrene were then added to said resin. After filtration a limpid slightly yellowish resin solution having a solids content of about 70% was obtained.

To 100 parts of said resin solution there was added 4 parts of a 40% solution of methylethylketone peroxide in dimethylphthalate and 1% of a solution of cobalt naphthenate in styrene, the cobalt content of which was 4%. Film-coaings prepared from this solution on wood, glass or metal were, even when applied in a thickness of less than 100 microns, so dry after a few minutes that no dust adhered thereto and were, after at the most 80 minutes, tack-free. The film-coatings were characterized by a high gloss and an excellent surface hardness.

*Example 3.*—15.6 parts of diallylidene pentaerythritol were reacted with 7 parts of pentaerythritol diallylether and 24 parts of an ester of OH value 216 and acid value 10 in the presence of 0.2 part of a complex of boron trifluoride and tetrahydrofuran at 60° C. while passing a current of carbon dioxide through the reaction mixture until the OH value was 62 and the acid value was 6. The reaction took about 5 hours. (The ester was prepared by reacting 235 parts of maleic anhydride, 186 parts of fumaric acid, 350 parts of ethylene glycol and 65 parts of butanediol-1,3 in the melt.) The highly viscous limpid resin thus obtained was admixed with 0.052 part of sodium hydroxide dissolved in methanol, 0.005 part of hydroquinone and 19 parts of styrene. The resin solution could be stored for several months. After addition of one of the conventional organic peroxides and an accelerator (as described in the preceding example,) film-coatings could be prepared which dried tack-free at room temperature. These coatings had good mechanical properties and were resistant against chemical agents.

*Example 4.*—21.7 parts of diallylidene pentaerythritol were reacted with 7 parts of trimethylolpropane-monoallyl ether and 24 parts of an ester of OH value 240 and acid value 25, in the presence of 0.16 part o fa complex compound of boron trifluoride and ethyleneglycol-monomethyl ether for 5½ hours at 70° C. (The ester was prepared by reacting in the melt 0.5 part of fumaric acid, 0.4 mol of maleic acid, 0.1 mol of adipic acid, 1.4 mol of ethylene glycol and 0.2 mol of propylene glycol.) The resulting limpid highly viscous resin had OH value of 93 and acid value of 12. This resin was stabilized by adding while stirring 0.056 part of sodium hydroxide dissolved in methanol and 0.005 part of hydroquinone and was then diluted by 20 parts of styrene.

After filtration a limpid resin solution was obtained. From this solution film coatings having the properties described in Example 1 could be prepared after addition of an organic peroxide and a cobalt accelerator.

*Example 5.*—180 parts of diallylidene pentaerythritol, 35 parts of pentaerythritoldibenzyl ether, 35 parts of glycerol-α-allyl ether and 240 parts of an ester of OH value 290 and acid value 6 were reacted in the presence of 0.25 part of p-toluene sulphonic acid for 3 hours at 60° C. and for an additional 3 hours at 80° C. while passing a current of carbon dioxide through the reaction mixture. (The ester was prepared from 294 parts of maleic anhydride, 348 parts of fumaric acid, and 596 parts of ethylene glycol.) The resulting limpid slightly brownish resin having an OH value of 49 and acid value 4 was admixed with intimate stirring with 0.52 part of sodium hydroxide dissolved in 4 parts of methanol, 0.05 part of hydroquinone and 220 parts of vinyl toluene. To 100 parts of this resin solution there were added 4 parts of a paste of cyclohexanone peroxide of 50% strength and 1 part of a solution of cobalt octoate in styrene, the cobalt content of which was 4%. From this resin solution which had a solids content of about 70%, film-coatings could be prepared which when applied at a room temperature of 23° C. were so dry after 20 minutes that no dust adhered thereto, and were tack-free after 2 hours.

*Example 6.*—16.4 parts of diallylidene pentaerythritol, 24 parts of an ester of acid value 32 and hydroxy value 207 and 7 parts of ethylene glycolmonoallyl ether were reacted in the presence of 0.18 part of a complex compound of boron trifluoride and ethyl ether for 4 hours at 60° C. (The ester was prepared by reacting in the melt 0.6 mol of maleic anhydride, 0.4 mol of fumaric acid, 1.1 mol of ethylene glycol and 0.2 mol of propylene-glycol.) The resulting highly viscous almost colourless resin had acid value 19.6 and hydroxy value 61. This resin was admixed with 0.003 part of hydroquinone, 0.4 part of methanol containing 0.052 part of sodium hydroxide, and with 20.4 parts of styrene. The solution was then filtered and 4% of a 50% solution of methylethylketone peroxide in diallylphthalate and 2% of a solution of cobalt naphthenate in styrene, the cobalt content of which was 4%, added thereto. Film-coatings prepared on wood from this solution were so dry after 20 minutes that no dust adhered thereto and were after 100 minutes completely tack-free. Film-coatings of a thickness of 250 microns applied on glass after 24 hours had "pendulum values" of 90 seconds. The "pendulum values" which are characteristic for surface hardness have been measured with the pendulum test device according to W. Konig (see Farbe und Lack, volume 59 (1953), page 435) and mean that the amplitude of the pendulum has been reduced to half of its original value only after 90 seconds.

*Example 7.*—24 parts of an ester of acid value 25.8 and hydroxy value 192, 12.6 parts of diallylidene pentaerythritol and 8 parts of trimethylolpropane-diallyl ether were reacted, with constant stirring, for 3 hours at 60° C. in the presence of 0.18 part of a complex of boron trifluoride and tetrahydrofuran. (The said ester was prepared by reacting 0.8 mol fumaric acid, 0.2 mol maleic anhydride, 0.65 mol ethylene glycol, 0.65 mol propylene glycol-1,2 and 0.05 mol butylene glycol-1,3.) The resulting highly viscous colourless resin had acid value 18 and hydroxy value 70. This resin was diluted with 19.1 parts of styrene and stabilized by an addition of 0.093 part of hydroquinone and 0.052 part of sodium hydroxide dissolved in 0.4 part methanol. This solution which had a solids content of 70% was filtered. Then 4% of a 50% solution of methylethylketone peroxide in diallylphthalate and 2% of a solution of cobalt naphthenate in styrene, the cobalt content of which was 4%, were added to the resin solution. Film-coatings prepared from this solution on wood or glass were tack-free after 84 minutes and could, if desired, be abraded and polished after only 5 hours.

*Example 8.*—70 parts of the linear polyether acetal resin obtained in Example 2 were admixed with 20 parts of styrene and 10 parts of acrolein diallyl acetal so as to form a resin solution having a solids content of about 70%. 4 parts of a 40% solution of cyclohexanone peroxide in dimethylphthalate and 2 parts of a solution of cobalt naphthenate in styrene (cobalt content 4%) were then added to the solution. Film-like coatings prepared from this mixture on wood, glass or metal e.g. in a thickness of about 100μ were so dry after 10 minutes that no dust adhered thereto and had a scratch resistant surface after 4 hours.

*Example 9.*—An ester of the acid value 23 and the OH-value 335 has been produced by reacting in the melt 208.8 parts of fumaric acid, 117.6 parts of maleic anhydride, 279 parts of ethylene glycol and 22.8 parts of propanediol-1,2. 24 parts of this ester and 7 parts of pentaerythritol triallyl ether are then added to 37.6 parts of bis-(2-vinyl-1,3-dioxolane-4-butyl)-terephthalate in the presence of 0.18 part of boron trifluoride tetrahydrofuran complex in a current of carbon dioxide at a temperature of about 60 to 70° C. After about 3½ hours the polyadduct has an OH-value of 112 and an acid value of 13. The highly-viscous resin is then admixed with 28 parts of styrene, 0.041 part of solid sodium hydroxide dissolved in methanol and 0.004 part of hydroquinone. After filtration a clear water-white resin solution having a solids content of about 70% is obtained.

0.4 part of a 40% solution of methylethylketone peroxide in dimethylphthalate and 0.2 part of a solution of cobalt naphthenate in styrene (cobalt content 4%) are then added to 10 parts of the resin solution. Film-like coatings of a thickness of about 100μ produced from this mixture, e.g. on metal, are completely tack-free after only 50 minutes. They have a very good adhesivity and elasticity which remains almost unchanged for a long period.

Instead of the bis-(2-vinyl-1,3-dioxolane-4-butyl)-terephthalate other unsaturated acetals could be used. Thus, from the corresponding orthophthalate a polyadduct of an OH value of 91 and an acid value of 12 and from the corresponding maleate and itaconate respectively polyadducts of an OH value of 100 and an acid value of 14 are obtained. From these polyadducts also film-like coatings with excellent properties are produced if copolymerized in the aforesaid manner with styrene.

Also coatings and shaped bodies with good properties could be produced by copolymerizing styrene with a mixture of diallylidene pentaerythritol and any one of the aforesaid esters.

What is claimed is:

1. A process for the production of synthetic resins, which comprises reacting (A) at least one diallylidene acetal selected from the group consisting of diallylidene pentaerythritol and a diester of a dicarboxylic acid with a monoallylidene acetal of an at least trihydric alcohol, said monoallylidene acetal still containing one reactive hydroxy group, with (B) at least one ester containing free excess alcoholic hydroxy groups which is the condensation reaction product of (1) at least one polyhydric alcohol and (2) at least one difunctional acid free from acetylenic bonds in which acid component at least 50 equivalent percent consist of the radical of at least one α,β-ethylenically unsaturated dicarboxylic acid and (C) at least one compound selected from the group consisting of allyl and benzyl ethers of a polyhydric alcohol, which ethers contain at least one free hydroxy group in their molecule, in the presence of a catalytic amount of (D) an acid reacting addition catalyst.

2. A process as claimed in claim 1, wherein the said ether of a polyhydric alcohol is used in an amount between 10 and 60 percent by weight, calculated on the sum of the components (A) and (B).

3. A process as claimed in claim 1, wherein the ester (B) used has an OH-value between 100 and 350 and an acid value between 5 and 50.

4. A process for the production of synthetic resins, which comprises reacting (A) at least one diallylidene acetal selected from the group consisting of diallylidene pentaerythritol and a diester of a dicarboxylic acid with a monoallylidene acetal of an at least trihydric alcohol, said monoallylidene acetal still containing one reactive hydroxy group, with (B) at least one ester containing free excess alcoholic hydroxy groups and having an OH-value between 100 and 350 and an acid value between 5 and 50, being the condensation reaction product of (1) at least one polyhydric alcohol and (2) at least one difunctional acid free from acetylenic bonds in which acid component at least 70 equivalent percent consist of the radical of at least one $\alpha,\beta$-ethylenically unsaturated dicarboxylic acid and (C) at least one compound selected from the group consisting of allyl and benzyl ethers of a polyhydric alcohol, which ethers contain at least one free hydroxy group in their molecule and are applied in an amount between 10 and 60 percent by weight, calculated on the sum of the components (A) and (B), in the presence of a catalytic amount of (D) an acid reacting addition catalyst to yield a polyadduct having a hydroxyl value of less than 150 and an acid value below 40.

5. A process as claimed in claim 4, wherein the ester (B) has a hydroxy value between 170 and 300 and an acid value between 10 and 30.

6. A process as claimed in claim 4, wherein the said compound selected from the group consisting of allyl and benzyl ethers is applied in an amount between 10 and about 22 percent by weight, calculated on the sum of components (A) and (B).

7. A process as claimed in claim 4, wherein the reaction is continued until the polyadduct formed has a hydroxyl value of less than 100.

8. A process as claimed in claim 4, wherein the reaction is continued until the reaction product has an OH-value between 80 and 130, and wherein this product is reacted with at least one halosilane.

9. A process as claimed in claim 4, wherein the reaction is continued until the reaction product has an OH-value between 100 and 120, and wherein this product is reacted with 5 to 15 percent, calculated on the weight of the said reaction product, of at least one halosilane.

10. A process as claimed in claim 4, wherein allyl alcohol is also added in an amount between 5 and 15 percent by weight, calculated on the sum of the components (A) and (B).

11. A process for the production of synthetic resins, wherein the final product obtained according to claim 1 is copolymerized with at least one normally liquid ethylenically unsaturated monomer, having the group $C=CH_2$ and being free from conjugated double bonds, under the action of an organic peroxide.

12. A process as claimed in claim 11, wherein the copolymerization is also carried out under the influence of an redox accelerator.

13. A process as claimed in claim 11, wherein the ethylenically unsaturated monomer is used in an amount between 20 and 50 percent, calculated on the weight of the final mixture.

14. A polymerizable solution of the product obtained according to claim 1 in at least one normally liquid ethylenically unsaturated monomer having the group $>C=CH_2$ and being free from conjugated double bonds, said solution also containing an alkaline reacting substance in an amount at least equivalent to that of the catalyst used in the process of claim 1 and a polymerization inhibitor.

15. Solid shaped bodies and films prepared from the products obtained according to claim 1.

16. Solid shaped bodies and films prepared from the products obtained according to claim 11.

17. Solid shaped bodies and films prepared from the solution of claim 14.

18. A process as claimed in claim 11, wherein the product obtained according to claim 1 was produced from diallylidene pentaerythritol and wherein acrolein diallyl acetal is also present in an amount up to 50% by weight of the diallylidene pentaerythritol used in the manufacture of polyether.

References Cited by the Examiner

UNITED STATES PATENTS

| | | | |
|---|---|---|---|
| 2,852,487 | 9/1958 | Maker | 260—861 |
| 2,937,230 | 5/1960 | Rogers | 260—827 |
| 2,945,003 | 7/1960 | Olson et al. | 260—827 |
| 2,984,643 | 5/1961 | Nischk et al. | 260—861 |

FOREIGN PATENTS 757,573  9/1956  Great Britain.

OTHER REFERENCES

Jenkins et al.: "The Design of Unsaturated Polester Resins for Surface Coatings," Journal of Oil and Colour Chemists' Association, January 1961, pp. 42–60.

MURRAY TILLMAN, *Primary Examiner.*

J. T. GOOLKASIAN, *Assistant Examiner.*